June 24, 1969   B. DEGAETANO   3,451,584
OIL FILLER BREATHER CAP
Filed May 19, 1967
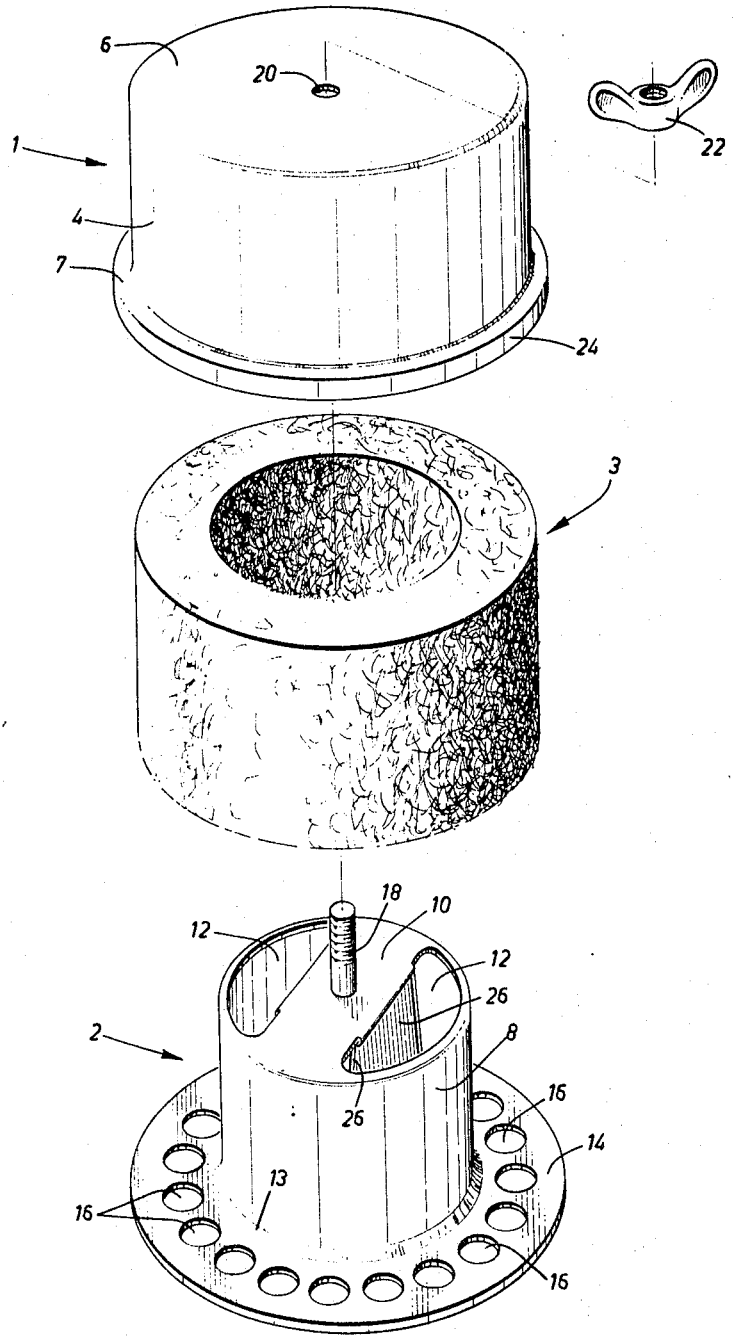
INVENTOR.
BEN DEGAETANO
BY Arne J. Fors
Agent United States Patent Office 3,451,584
Patented June 24, 1969

3,451,584
OIL FILLER BREATHER CAP
Ben Degaetano, Tarrytown, N.Y., assignor to Continental Research & Development Ltd., Toronto, Ontario, Canada, a company of Canada
Filed May 19, 1967, Ser. No. 639,674
Int. Cl. B65d *51/16;* B01d *19/00, 27/02*
U.S. Cl. 220—44                                                       1 Claim

ABSTRACT OF THE DISCLOSURE

This disclosure relates to an improved oil breather cap having co-operating component parts which can be releasably secured together to permit the facile replacement of a filter element.

Background of the invention

The present invention relates to oil breather caps of the type used to close the open upper ends of oil filter pipes of internal combustion engines.

It is well known to provide such oil breather caps with a gaseous passageway to permit the escape of fumes from the oil chamber of an engine to the atmosphere and to allow air to enter the oil chamber. In order to avoid contamination of the engine oil with particulate material such as dust, it is known to provide a filter element in such a breather cap.

It has previously been the practice to replace such a breather cap when the filter element therein became clogged, since any attempt to clean such a filter element is both time-consuming and expensive particularly in view of contemporary labour costs.

It is accordingly a principal object of the present invention to provide an oil breather cap which has a much longer useful life and in which the filter element may be simply and inexpensively replaced.

Summary of the invention

The present invention is broadly applicable to an oil breather cap comprising:

(a) A hollow inner member adapted to fit the upper end of an oil filler tube of an engine and having an upper end plate with at least one passageway therethrough and an open lower end defined by a lower end rim, (b) A hollow outer member having an open lower end defined by a lower end rim and an upper end closed by an end member and surrounding said inner member to form a chamber therebetween, in which chamber a filter element may be disposed, said end member which closes the upper end of said outer member being spaced apart from said upper end plate of said inner member, and (c) A lower end plate member having apertures provided therethrough and being disposed between said lower end rim of said inner member and said lower end rim of said outer member.

In accordance with the present invention, an oil breather cap of the type hereinbefore defined is improved by forming it as two co-operating component parts which co-operating component parts can be secured together with said members in their specified relative dispositions but which can be readily released to permit the replacement of a filter element in said chamber, one of said co-operating parts comprising said end member which closes the upper end of said outer member and the other of said co-operating parts comprising said lower end plate member having apertures.

A breather cap in accordance with a preferred feature of the present invention will be formed with said inner and outer hollow members as generally co-axial generally cylindrical hollow members. It is particularly preferred for the first component part to comprise the hollow outer member and the end member which closes the upper end of the outer member and to have the second component part comprise the hollow inner member and the lower end plate member having apertures. In such an embodiment, the lower end rim of the outer hollow member is usefully provided with a peripheral recess which co-acts with the lower end plate member having apertures.

The two co-operating component parts of a breather cap in accordance with the invention can be releasably secured together in any convenient manner. One particularly useful method for so doing comprises providing the hollow inner member with a threaded rod as a projection from its upper end. Such a threaded rod passes through an opening in the end member which closes the upper end of the outer hollow member. In such a way, the two component parts may be simply secured together by means of a nut screwed on the threaded rod.

Description of the drawing and preferred embodiment

The invention will now be described by way of illustration with reference to the accompanying drawing which is an exploded perspective view of an oil breather cap in accordance with the invention.

The breather cap shown in the drawing comprises a first component part generally indicated at 1 and a second component part generally indicated at 2 which, when assembled together as will be more fully described hereinafter, house a filter element 3.

The first component part 1 of the breather cap comprises a generally cylindrical hollow outer member 4 having its upper end closed by an integrally formed end member 6. This outer member 4 has an open lower end defined by a lower end rim 7. The second component part 2 of the breather cap comprises a generally cylindrical hollow inner member 8 having integrally formed therewith an upper end plate 10 with two apertures or passageways 12 formed therein, an open lower end defined by a lower end rim 13, and a radially projecting lower end plate member 14 with a plurality of apertures 16 provided therethrough.

It will be noted that when the second component part 2 is disposed within the first component part 1, an annular chamber will be formed between the cylindrical outer member 4 and the cylindrical inner member 8. It is in this chamber that the filter element 3 is disposed. It will also be noted that the lower end plate member 14 will be disposed between the lower end rim 7 of the cylindrical outer member 4 and the lower end rim 13 of the cylindrical inner member 8.

In accordance with an essential feature of the present invention, the first component part 1 and the second component part 2 are secured together in such a manner that they may be readily separated to permit the replacement of a filter element such as the filter element 3.

In the embodiment illustrated in the drawing, the component parts 1 and 2 are secured together by means of a threaded rod or bolt 18 provided in the centre of the upper end plate 10 of the generally cylindrical hollow inner member 8. When a filter element 3 is in position and the two component parts 1 and 2 of the breather cap are fitted together, the bolt 18 passes through a hole 20 provided in the centre of the end member 6 which closes the upper end of the generally cylindrical hollow outer member 4 and the two component parts 1 and 2 may then be secured together by nut means such as wing nut 22.

In order to provide the desired separation or spaced apart relationship between the upper end plate 10 of the generally cylindrical hollow inner member 8 and the upper end member 6 of the generally cylindrical hollow outer member 4, a lip or peripheral recess 24 is provided at the lower end rim 7 of the outer member 4. When the two component parts 1 and 2 are fitted together, the outer periphery of lower end plate member 14 abuts lip 24 and prevents further inward movement of inner member 8 into the outer member 4.

Since the generally cylindrical hollow outer member 4 has a greater axial length than the generally cylindrical hollow inner member 8, the desired spaced apart relationship of end member 6 and upper end plate 10 is ensured.

It will be appreciated that the desired spacing apart relationship of end member 6 and upper end plate 10 can be obtained in any other convenient manner and that the provision of lip 24 is not essential in breather caps according to the invention. Such spaced apart relationship could, for example, alternatively be provided by means of spacers or washers provided on bolt 18 or in any other convenient manner.

It will further be appreciated that the various members comprising the component parts 1 and 2 may be combined together in combinations different from that illustrated. For instance, the generally cylindrical hollow outer member 4, the generally cylindrical hollow inner member 8 and the lower end plate member 14 may be integrally formed as one component part and the end member 6 for the generally cylindrical hollow outer member 4 may comprise the second component 2. In such an embodiment, simple removal of end member 6 would permit replacement of filter element 3.

As is well known, such breather caps are used to close the upper end of the oil filler tube of an engine. Any suitable means may be adopted for holding such a breather cap in position on an oil filler tube and, in the embodiment illustrated, the cap is provided, for this purpose, with spring metal leaves 26 extending downwardly from upper end plate 10. In this embodiment, the upper end of an oil filler tube (not shown) is gripped between such leaves 26 and the inner surface of cylindrical member 8. Other means for securing the cap on the end of a filler tube may, however, be utilized without departing from the scope of the invention.

It will readily be understood that the improved construction of an oil breather cap in accordance with the invention in no way affects the operation of the cap as a filtering device. In use, fumes may pass from the engine oil filler tube into the inside of cylindrical hollow inner member 8, through openings 12, through the space between upper end plate 10 and end member 6 and finally downwardly through the filter element and the apertures 16 to the atmosphere. When the gas flow is in the opposite direction, air entering the oil filler tube through the breather cap will be freed by the filter element 3 of undesired particles such as dust. In view of the ease with which it is possible to replace the filter element 3 without the expense of replacing the entire breather cap, more efficient engine operation can fairly be anticipated.

What I claim as new and desire to protect by Letters Patent of the United States is:

1. In an oil breather cap comprising:
    (a) a hollow cylindrical inner member adapted to fit the upper end of an oil filler tube of an engine and having an upper end plate with at least one passageway therethrough and an open lower end defined by a lower end rim,
    (b) a hollow cylindrical outer member having an open lower end defined by a lower end rim having a peripheral recess and an upper end closed by an end member, concentric with and surrounding said inner member to form a chamber therebetween in which chamber a filter element may be disposed, said end member which closes the upper end of said outer member being spaced apart from said upper end plate of said inner member, and
    (c) a lower end plate member, having apertures provided therethrough, formed integral with the lower end rim of the hollow cylindrical inner member and being disposed between said lower end rim of said inner member and said lower end rim of said outer member for abutment with the lower end rim peripheral recess;

the improvement which comprises forming said breather cap as two co-operating component parts which can be secured together with said members in their specified relative dispositions but which can be readily released to permit the replacement of a filter element in said chamber, one of said co-operating component parts comprising said end member which closes the upper end of said outer member and the other of said co-operating component parts comprising said lower end plate member having apertures, and a threaded rod formed as a projection from the upper end of the hollow inner member which passes through an opening in the end member which closes said upper end of said hollow outer member, whereby said first and second component parts may be removably secured together with said members in their specified relative dispositions by means of a nut screwed onto said threaded rod.

References Cited

UNITED STATES PATENTS 2,675,886    4/1954    McMullen _____ 55—510
2,784,801    3/1957    Lunde _____ 220—44

JAMES B. MARBERT, *Primary Examiner.*

U.S. Cl. X.R.

55—510